US012033466B2

(12) United States Patent
Nelson et al.

(10) Patent No.: US 12,033,466 B2
(45) **Date of Patent: *Jul. 9, 2024**

(54) ELECTRONIC GAMING MACHINE WITH DEDICATED PAYMENT ACCEPTORS FOR DIFFERENT BETTING OPPORTUNITIES

(71) Applicant: IGT, Las Vegas, NV (US)

(72) Inventors: Dwayne R. Nelson, Las Vegas, NV (US); Kevin Higgins, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 18/295,419

(22) Filed: Apr. 4, 2023

(65) Prior Publication Data

US 2023/0237876 A1 Jul. 27, 2023

Related U.S. Application Data

(63) Continuation of application No. 17/685,078, filed on Mar. 2, 2022, now Pat. No. 11,625,981, which is a continuation of application No. 17/017,130, filed on Sep. 10, 2020, now Pat. No. 11,276,276, which is a continuation of application No. 16/140,808, filed on Sep. 25, 2018, now abandoned.

(51) Int. Cl.
*G07F 17/32* (2006.01)

(52) U.S. Cl.
CPC ...... *G07F 17/3244* (2013.01); *G07F 17/3216* (2013.01); *G07F 17/3262* (2013.01)

(58) Field of Classification Search
CPC .. G07F 17/32; G07F 17/3216; G07F 17/3244; G07F 17/3246; G07F 17/3248; G07F 17/3251; G07F 17/3253; G07F 17/326; G07F 17/3262
See application file for complete search history.

(56) References Cited

U.S. PATENT DOCUMENTS

| | | | | |
|---|---|---|---|---|
| 5,332,076 | A | 7/1994 | Ziegert | |
| 6,379,248 | B1 | 4/2002 | Jorasch et al. | |
| 7,993,198 | B2 | 8/2011 | Walker et al. | |
| 8,272,947 | B2 | 9/2012 | Gagner et al. | |
| 8,442,918 | B2 | 5/2013 | Gabriele et al. | |
| 8,512,120 | B2 | 8/2013 | Nelson et al. | |
| 8,864,135 | B2 | 10/2014 | Baerlocher et al. | |
| 9,443,385 | B2 | 9/2016 | Adiraju et al. | |
| 9,508,220 | B2 | 11/2016 | Walker et al. | |
| 9,824,523 | B2 | 11/2017 | Cannon et al. | |
| 10,515,512 | B1 | 12/2019 | Thoeni et al. | |
| 10,867,475 | B1 | 12/2020 | Nelson et al. | |
| 11,276,276 | B2 | 3/2022 | Nelson et al. | |
| 11,625,981 | B2 * | 4/2023 | Nelson | G07F 17/3216 463/25 |
| 2001/0055989 | A1 | 12/2001 | Thomas | |
| 2002/0183105 | A1 | 12/2002 | Cannon et al. | |
| 2003/0040359 | A1 * | 2/2003 | Bryant | G07F 17/3227 463/25 |
| 2003/0195037 | A1 | 10/2003 | Vuong et al. | |
| 2005/0040006 | A1 | 2/2005 | Kodela et al. | |
| 2005/0096126 | A1 | 5/2005 | Prasad et al. | |

(Continued)

*Primary Examiner* — Milap Shah
(74) *Attorney, Agent, or Firm* — Neal, Gerber & Eisenberg LLP

(57) ABSTRACT

An electronic gaming machine with a plurality of separate payment acceptors to keep funds received for different betting purposes separate.

20 Claims, 3 Drawing Sheets

(56) References Cited

U.S. PATENT DOCUMENTS

| | | | | |
|---|---|---|---|---|
| 2007/0155497 | A1 | 7/2007 | Okada | |
| 2009/0005176 | A1 | 1/2009 | Morrow et al. | |
| 2009/0111573 | A1 | 4/2009 | Iddings | |
| 2009/0117999 | A1 | 5/2009 | Johnson et al. | |
| 2009/0325668 | A1* | 12/2009 | Kelly | G07F 17/3274 463/20 |
| 2009/0325669 | A1* | 12/2009 | Kelly | G07F 17/3211 463/20 |
| 2009/0325670 | A1* | 12/2009 | Kelly | G07F 17/3258 463/20 |
| 2010/0004053 | A1 | 1/2010 | Acres | |
| 2010/0004054 | A1 | 1/2010 | Acres | |
| 2010/0197385 | A1 | 8/2010 | Aoki et al. | |
| 2010/0323789 | A1 | 12/2010 | Gabriele et al. | |
| 2011/0045896 | A1 | 2/2011 | Sak et al. | |
| 2012/0122565 | A1 | 5/2012 | Mishra | |
| 2012/0252556 | A1* | 10/2012 | Doyle | G07F 17/3246 463/25 |
| 2013/0081923 | A1 | 4/2013 | Frady et al. | |
| 2014/0121006 | A1 | 5/2014 | Johnson | |
| 2014/0274252 | A1 | 9/2014 | Chun | |
| 2015/0034451 | A1 | 2/2015 | Takeda | |

* cited by examiner

100

ELECTRONIC GAMING MACHINE WITH DEDICATED PAYMENT ACCEPTORS FOR DIFFERENT BETTING OPPORTUNITIES

PRIORITY CLAIM

This application is a continuation of, claims priority to and the benefit of U.S. patent application Ser. No. 17/685,078, filed on Mar. 2, 2022, which is a continuation of, claims priority to and the benefit of U.S. patent application Ser. No. 17/017,130, filed on Sep. 10, 2020, which is a continuation of, claims priority to and the benefit of U.S. patent application Ser. No. 16/140,808, filed on Sep. 25, 2018, the entire contents of which are each incorporated by reference herein.

BACKGROUND

Gaming machines may provide players awards in primary games. Such gaming machines may include a payment acceptor, such as a bill validator which accepts and reads data from bills, such as paper currency and/or cashless ticket vouchers. Following adding the amount associated with the bill to a gaming machine credit balance, the gaming machines generally requires the player to place a wager, drawn from the credit balance, to activate the primary game.

BRIEF SUMMARY

In certain embodiments, the present disclosure relates to an electronic gaming machine including a first payment acceptor, a second payment acceptor, a processor, and a memory device which stores a plurality of instructions. When executed by the processor responsive to a physical item being received via the first payment acceptor, the instructions cause the processor to modify a first credit balance associated with a first wagering activity, wherein the modification is based on a monetary value associated with the received physical item, and responsive to a placement of a first wager associated with the first wagering activity, reduce the first credit balance based on the first wager. When executed by the processor responsive to the physical item being received via the second payment acceptor, the instructions cause the processor to modify a second, separate credit balance associated with a second, different wagering activity, wherein the modification is based on the monetary value associated with the received physical item, and responsive to a placement of a second wager associated with the second wagering activity, reduce the second credit balance based on the second wager.

In certain embodiments, the present disclosure relates to an electronic gaming machine including a payment acceptor, a processor, and a memory device which stores a plurality of instructions. When executed by the processor responsive to a physical item associated with a monetary value being received via the payment acceptor and a determination to assign the monetary value to a first credit balance, the instructions cause the processor to modify the first credit balance associated with a first wagering activity, wherein the modification is based on the monetary value associated with the received physical item, and responsive to a placement of a first wager associated with the first wagering activity, reduce the first credit balance based on the first wager. When executed by the processor responsive to the physical item associated with the monetary value being received via the payment acceptor and a determination to assign the monetary value to a second, separate credit balance, the instructions cause the processor to modify the second, separate credit balance associated with a second, different wagering activity, wherein the modification is based on the monetary value associated with the received physical item, and responsive to a placement of a second wager associated with the second, different wagering activity, reduce the second, separate credit balance based on the second wager.

In certain embodiments, the present disclosure relates to a method of operating an electronic gaming machine which includes, responsive to a physical item being received via a first payment acceptor, modifying, by a processor, a first credit balance associated with a first wagering activity, wherein the modification is based on a monetary value associated with the received physical item, and responsive to a placement of a first wager associated with the first wagering activity, reducing, by the processor, the first credit balance based on the first wager. Responsive to the physical item being received via a second payment acceptor, the method includes modifying, by the processor, a second, separate credit balance associated with a second, different wagering activity, wherein the modification is based on the monetary value associated with the received physical item, and responsive to a placement of a second wager associated with the second wagering activity, reducing, by the processor, the second credit balance based on the second wager.

Additional features are described in, and will be apparent from, the following Detailed Description and the figures.

DETAILED DESCRIPTION

Activity Based Payment Acceptors

In various embodiments, the present disclosure pertains to an electronic gaming machine ("EGM") with a plurality of separate payment acceptors to keep funds received for different betting purposes separate. In these embodiments, a first payment acceptor, such as a first bill validator, operates to accept bills (e.g., paper currency and/or cashless ticket vouchers) to fund a first type of activity undertaken at the EGM, and a second payment acceptor, such as a second bill validator, operates to accept bills (e.g., paper currency and/or cashless ticket vouchers) to fund a second, different type of activity undertaken at the EGM. In such embodiments, the EGM may be a slot machine, a video poker machine, a video lottery terminal ("VLT"), a terminal associated with an electronic table game, a video keno machine, or a video bingo machine each of which includes a plurality of payment acceptors, such as bill validators, which are selectively employed in association with different activities available at the EGM. Such employment of multiple payment acceptors for the same EGM provides that different funds deposited for different purposes are separately maintained and separately reported (to one or more accounting entities, taxation entities, and/or regulatory entities) in accordance with applicable laws and regulations. This separate fund maintenance and reporting thus significantly reduces gaming establishment personnel time in attempting to determine which funds deposited via a single payment acceptor were used for which activities at the EGM.

Specifically, in view of the need to maintain separate reportable meters for different types of activities which may occur at (or otherwise be initiated from) an EGM, the EGM disclosed herein employs separate and distinct payment acceptors, such as separate and distinct bill validators, dedicated to different types of transactions which a user utilizes the EGM to facilitate. In certain embodiments, the present disclose pertains to an EGM with a plurality of separate payment acceptors to keep funds received for different betting purposes separate. In these embodiments, each bill validator is associated with a separate betting purpose such that bills (e.g., paper currency and/or cashless ticket vouchers) accepted for the placement of one type of wager, such as a sports bet, is not tracked or otherwise accounted for with the bills (e.g., paper currency and/or cashless ticket vouchers) accepted for the placement of another type of wager, such as a wager on a game of chance.

Figure 1:
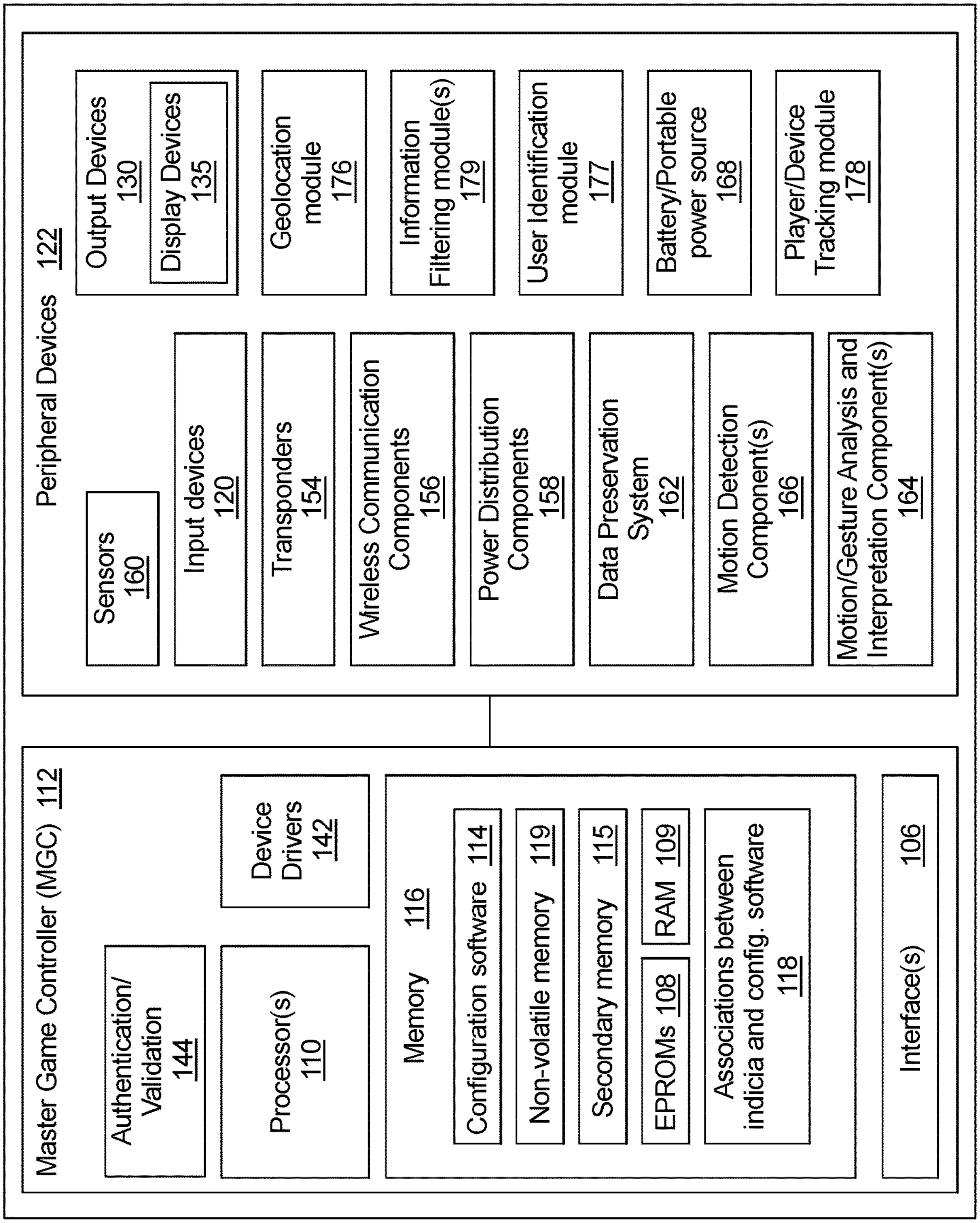
FIG. 1 is a schematic block diagram of one embodiment of an electronic configuration of an example electronic gaming machine disclosed herein.

In various embodiments, as seen in FIG. 1, the EGM 100 includes a master gaming controller 112 configured to communicate with and to operate with a plurality of peripheral devices 122. In certain embodiments, the peripheral devices 122 include several device interfaces, such as: (1) a plurality of input devices 120 (which may include contact and/or non-contact interfaces); (2) at least one output device 130 including at least one display device 135; (3) at least one transponder 154; (4) at least one wireless communication component 156; (5) at least one wired/wireless power distribution component 158; (6) at least one sensor 160; (7) at least one data preservation component 162; (8) at least one motion/gesture analysis and interpretation component 164; (9) at least one motion detection component 166; (10) at least one portable power source 168; (11) at least one geolocation module 176; (12) at least one user identification module 177; (13) at least one player/device tracking module 178; and (14) at least one information filtering module 179.

In various embodiment, the input devices 120 include a plurality of payment devices configured to communicate with at least one processor of the EGM to fund separate credit balances of the EGM.

Figure 2A:
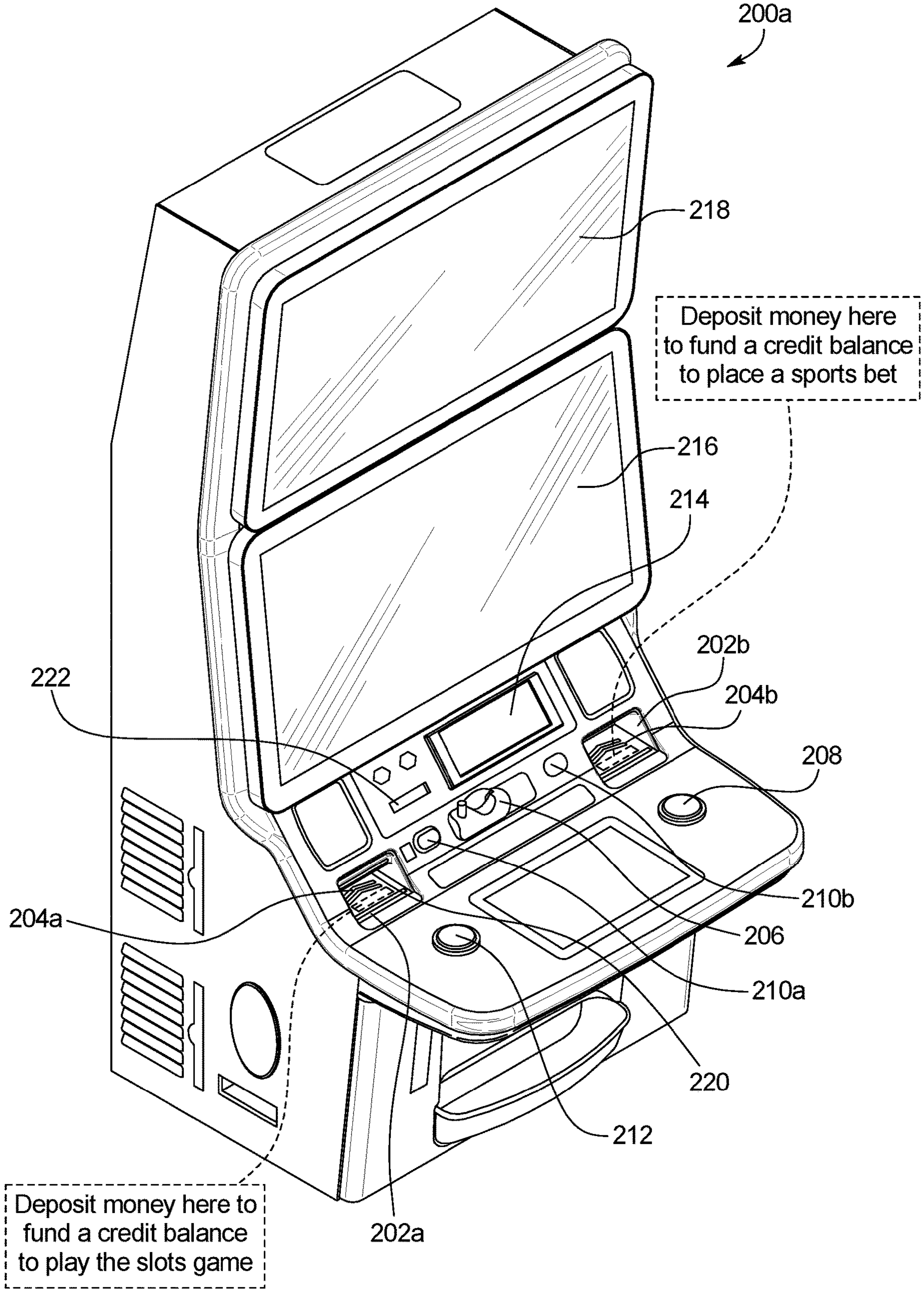
FIGS. 2A and 2B are perspective views of example alternative embodiments of the electronic gaming machine disclosed herein.
Figure 2B:
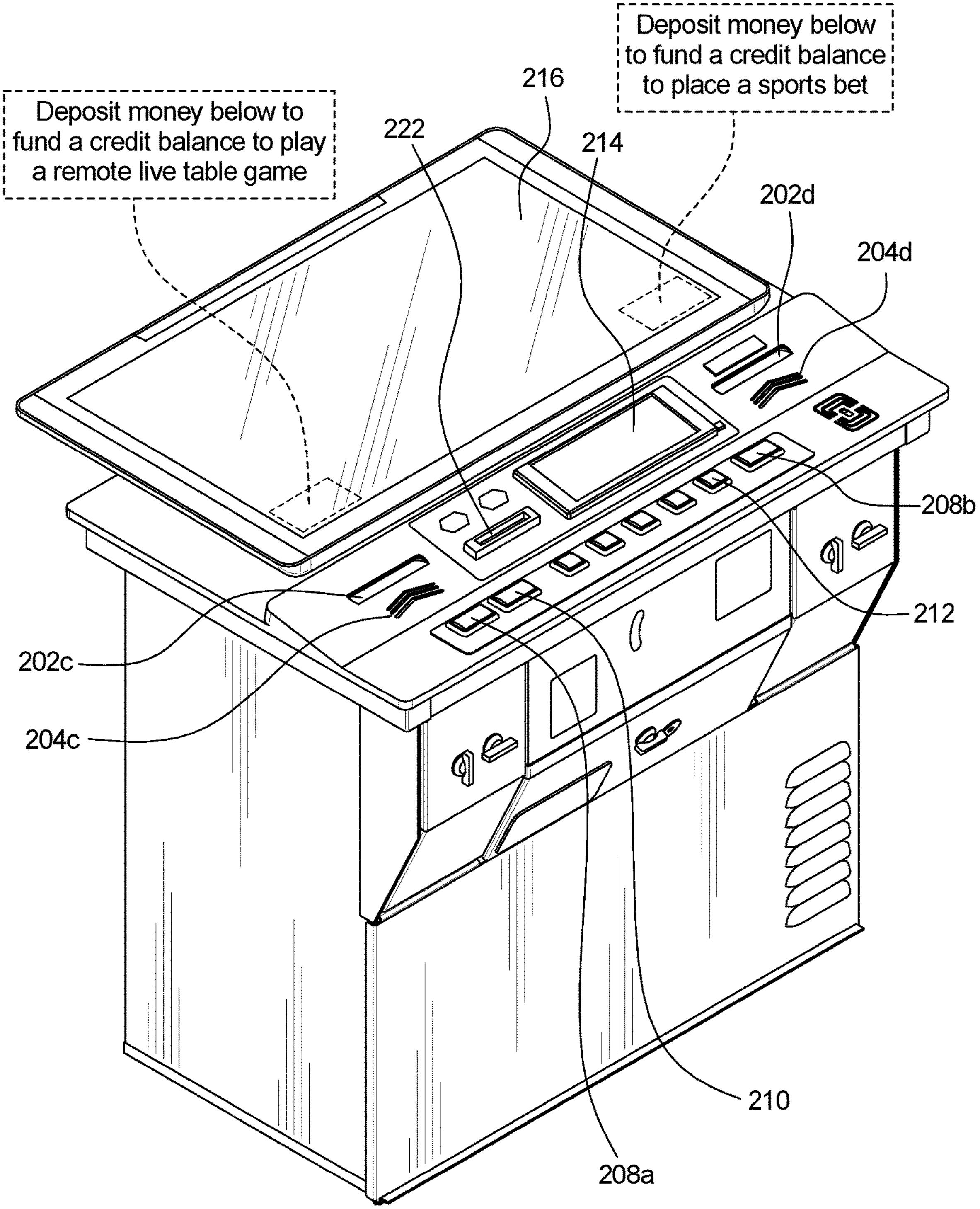

In certain embodiments, the plurality of payment devices includes a plurality of bill validators which accept bills (e.g., paper currency and/or cashless ticket vouchers) to fund separate credit balances of the EGM. For example, as seen in FIGS. 2A and 2B, the EGM includes a first bill validator **202*a* supported by the housing of the EGM and associated with a first type of activity undertaken at the EGM and further includes a second bill validator 202*b*** supported by the housing of the EGM and associated with a second, different type of activity undertaken at the EGM. Such activities include different betting activities such as, but not limited to, sports betting, game of chance betting (e.g., slots betting), interactive game betting (e.g., video poker betting), and/or live table game betting (i.e., a player placing wagers on a remote live table game from an EGM or kiosk). Such activities additionally or alternatively include non-betting activities, such as, but not limited to, using funds to purchase goods and/or services from the EGM, and/or transferring funds to a third party from the EGM.

In these embodiments, the EGM indicates to a player, such as using one or more indicators and/or one or more display devices, which of the bill validators to use to deposit funds (in the form of paper currency and/or cashless ticket vouchers) for which of the available activities.

For example, the EGM of FIG. 2A enables a player to partake in wagering on one or more games of chances as well as place one or more sports bets. In this example, as seen in FIG. 2A, the EGM utilizes indicators **204*a* to inform the player to use bill validator 202*a* to deposit paper currency (and/or cashless ticket vouchers) for the purpose of wagering one or more games of chance, such as one or more slot games. In this example, as also seen in FIG. 2A, the EGM also utilizes indicators to inform the player to use bill validator 202*b*** to deposit paper currency (and/or cashless ticket vouchers) for the purpose of placing one or more sports wagers on one or more sporting events.

In another example, the EGM of FIG. 2B enables a player to partake in wagering on one or more live table games taking place at a gaming table (remote to the EGM) as well as place one or more sports bets. In this example, as seen in FIG. 2B, the EGM includes one or more display devices 216 to inform the player to use bill validator **202*c* to deposit paper currency (and/or cashless ticket vouchers) for the purpose of live table game wagering. In this example, as also seen in FIG. 2B, the EGM also utilizes one or more display devices 216 to inform the player to use bill validator 202*d*** to deposit paper currency (and/or cashless ticket vouchers) for the purpose of placing one or more sports wagers on one or more sporting events. It should be appreciated that any combination of two or more payment acceptors, such as two or more bill validators, may be utilized in association with any two or more activities undertaken at the EGM.

In various embodiments, each of the bill validators is associated with a separate accounting system to which bills deposited via that bill validator are reported. In these embodiments, since different bill validators are assigned to receiving bills (e.g., paper currency and/or cashless ticket vouchers) for different purposes, the system tracks such received bills differently. In certain embodiments, for accounting and regulatory purposes, the EGM updates and maintains a variety of separate hard and/or soft meters for each of the bill validators of the EGM. In one embodiment, each bill validator is associated with zero, one or more hard meters, such as zero, one or more electro-mechanical devices, like a non-resettable odometer, with a display that advances to display a quantity of bills received via that bill validator. In another embodiment, each bill validator is additionally or alternatively associated with zero, one or more soft meters, (i.e., the electronic equivalents to the hard meters) which stores, data in a digital format, regarding a quantity of bills received via that bill validator.

In these embodiments, responsive to a player inserting a bill into a slot, such as a bezel, of a first bill validator associated with a first type of activity undertaken at the EGM, the first bill validator accepts the bill, scans the bill for validity and sends corresponding data to at least one processor of the EGM and/or one or more first peripheral devices, such as a first accounting server, to record the transaction of the deposit of the bill. As indicated above, since, in certain embodiments, the bills received by each bill validator are associated with different accounting systems, the EGM periodically communicates data associated with the receipt of one or more bills by the first bill validator to a first accounting system associated with the first type of activity while not communicating data associated with the receipt of any bills by the first bill validator to a second accounting system not associated with the first type of activity. For example, if the first bill validator is associated with the activity of wagering one or more games of chance, such as one or more slot games, then the EGM communicates data associated with one or more bills received by the first bill validator to a slot accounting system (without communicating data associated with any bills received by the first bill validator to any other accounting systems).

In these embodiments, following the validation of the received bill, the first bill validator transfers the received bill to a stack in a barcoded first bill receptacle or cashbox (not shown) for subsequent removal by the EGM operator to count the bills deposited into the EGM via the first bill validator. In these embodiments, upon deposit of an amount of funds associated with the bills received using the first bill validator, the EGM modifies a first credit balance associated with the first type of activity undertaken at the EGM. Following the modification of the first credit balance based on the deposit of bills via the first bill validator, the EGM enables the player to utilize the first credit balance (displayed on a first credit meter) to partake in the first type of activity (and not partake in any other type of activity not associated with the first bill validator). Continuing with the above example, after depositing one or more bills (e.g., paper currency and/or cashless ticket vouchers) into the EGM via the first bill validator to modify a first credit balance associated with wagering one or more games of chance, such as one or more slot games, the EGM enables the player to place one or more wagers on one or more games of chances using the funds of the first credit balance, wherein such funds of the first credit balance are not usable for any other activity undertaken at the EGM.

In addition to enabling a player to use the first bill validator to modify a first credit balance associated with a first type of activity, responsive to a player inserting a bill into a slot, such as a bezel, of a second, different bill validator associated with a second, different type of activity undertaken at the EGM, the second bill validator accepts the bill, scans the bill for validity and sends corresponding data to at least one processor of the EGM and/or one or more second peripheral devices, such as a second accounting server, to record the transaction of the deposit of the bill. As indicated above, since, in certain embodiments, the bills received by each bill validator are associated with different or separate accounting systems, the EGM periodically communicates data associated with the receipt of one or more bills by the second bill validator to a second accounting system associated with the second type of activity while not communicating data associated with the receipt of any bills by the second bill validator to a first accounting system not associated with the second type of activity. For example, if the second bill validator is associated with the activity of placing one or more sports wagers on one or more sporting events, then the EGM communicates data associated with one or more bills received by the second bill validator to a sports wagering accounting system (without communicating data associated with any bills received by the second bill validator to any other accounting systems).

In these embodiments, following the validation of the received bill, the second bill validator transfers the received bill to a stack in a barcoded second bill receptacle or cashbox (not shown) for subsequent removal by the EGM operator to count the bills deposited into the EGM via the second bill validator. In these embodiments, upon deposit of an amount of funds associated with the bills received using the second bill validator, the EGM modifies a second credit balance associated with the second type of activity undertaken at the EGM. Following the modification of the second credit balance based on the deposit of bills via the second bill validator, the EGM enables the player to utilize the second credit balance (displayed on a second credit meter) to partake in the second type of activity (and not partake in any other type of activity not associated with the second bill validator). Continuing with the above example, after depositing one or more bills (e.g., paper currency and/or cashless ticket vouchers) into the EGM via the second bill validator to modify a second credit balance associated with placing one or more sports wagers on one or more sporting events, the EGM enables the player to place one or more sports wagers on one or more sporting events using the funds of the second credit balance, wherein such funds of the second credit balance are not usable for any other activity undertaken at the EGM.

Such employment of multiple payment acceptors for the same EGM provides that different funds deposited for different purposes are separately maintained and separately reported (to one or more accounting entities, taxation entities, and/or regulatory entities) in accordance with applicable laws and regulations. This separate fund maintenance and reporting thus significantly reduces gaming establishment personnel time in attempting to determine which funds deposited via a single payment acceptor were used for which activities at the EGM.

It should be appreciated that while described as accepting bills in the form of paper currency and/or cashless ticket vouchers, any applicable funding source of the EGM may be utilized in association with one or more of the payment acceptors disclosed herein. For example, one or more payment acceptors, such as one or more bill validators, associated with one or more activities which may be undertaken at the EGM are each configured to accept any combination of currency, gaming vouchers, coupons and/or other instruments authorized for incrementing credits on an EGM.

In certain embodiments, each individual bill validator is associated with an individual cash storage box supported by the housing of the EGM and accessible by opening one or more doors or access panels of the EGM. In these embodiments, each individual cash storage box collects bills (e.g., paper currency and/or cashless ticket vouchers) deposited into the EGM using the bill validator associated with that cash storage box. In one such embodiment, each cash storage box is the same size and has the same capacity of bills it may hold. In another such embodiment, the cash storage boxes are different sizes and have different capacities of bills they may hold. For example, due to the volume of sports wagers placed compared to the volume of wagers placed on games of chance, the cash storage box associated with the bill validator that accepts bills to place sports wagers is smaller than the cash storage box associated with the bill validator that accepts bills to place wagers on games of chance.

In certain embodiments, since each bill validator is associated with an individual cash storage box, such bill validators (and associated cash storage boxes) are spaced apart from each other (to reduce the chances that a player may deposit a bill in the incorrect bill validator). In one such embodiment, if the player inserts a bill into the incorrect bill validator, the EGM rejects the bill and notifies the player to insert the bill into the correct bill validator. For example, if a player has a cashless ticket voucher associated with wagering on one or more games of chance and the player inserts that cashless ticket voucher into a bill validator associated with placing wagers on a remote live table game from the EGM, the EGM will reject the inserted cashless ticket voucher and display, via one or more display devices, a message informing the player to insert the cashless ticket voucher into the bill validator associated with wagering on one or more games of chance.

In certain embodiments, one or more of the bill validators are each configured to mark inserted cashless ticket vouchers with suitable indicia when received. In these embodiments, such bill validators include a printing or branding mechanism to indicate or otherwise brand each received cashless ticket voucher as paid (along with the date, time and amount paid). For example, to comply with certain regulatory requirements, when a sports wagering ticket is received by a bill validator, the bill validator prints the word "PAID" on the ticket along with the date, time and amount paid and then proceeds to route the received sports wagering ticket to the appropriate destination.

In an alternative embodiment, rather than using separate bill validators for each different activity available at the EGM, the EGM utilizes a single bill validator which is associated with a plurality of separate barcoded cash storage boxes for the plurality of different activities which may be undertaken at the EGM. In one such embodiment, each cash storage box of an EGM includes a different barcode. In another such embodiment, each cash storage box of an EGM includes the same barcode. In another such embodiment, each cash storage box of an EGM includes a different version of the same barcode. In these embodiments, the use of the same and/or different barcodes enables gaming establishment personnel to keep different bills collected for different purposes separate for accounting, taxation and regulatory purposes.

In these embodiments, the single bill validator routes the received bills to the appropriate cash storage box associated with the intended activity, wherein the EGM informs the player of which activity is currently associated with the single bill validator (and thus which credit balance will be increased and which cash storage box will be used) if the player inserts one or more bills at that time.

In one such embodiment, the EGM associates one of the credit balances associated with one of the available activities as a default credit balance wherein any bills received by the bill validator fund that credit balance and are routed to the cash storage box associated with that available activity. For example, the bill validator uses a credit balance and cash storage box associated with wagering on one or more games of chance as a default credit balance and a default cash storage box wherein funds deposited into the single bill validator modify the default credit balance and are routed to the default cash storage box unless one or more inputs are received by the EGM indicating that funds to be deposited are for other purposes.

In another such embodiment, either before or after inserting one or more bills into a bill validator, the EGM enables the player to indicate, via one or more inputs, which credit balance the bills should be associated with (and thus which cash storage box one or more received bills should be routed to).

In another such embodiment, the EGM determines, based on the state of one or more of the credit balances, which credit balance one or more received bills should be associated with (and thus which cash storage box one or more received bills should be routed to). For example, if $0 is on a credit balance associated with wagering on one or more games of chance and $250 is on a credit balance associated with placing one or more sports wagers on one or more sporting events, the EGM determines that any bills deposited via the bill validator should be used to increase the credit balance associated with wager on one or more games of chance.

In another such embodiment, the EGM determines, based on a current mode of the EGM (which may be determined based on recent inputs made at the EGM), which credit balance one or more received bills should be associated with (and thus which cash storage box one or more received bills should be routed to). For example, if the EGM is currently functioning as a sports wagering terminal (based on inputs made by the player pertaining to one or more available sports wagers), the EGM determines that any bills deposited via the bill validator should be associated with a credit balance associated with placing one or more sports wagers on one or more sporting events.

In another embodiment, the EGM employs one payment acceptor, such as one bill validator, associated with one activity and the EGM also employs another payment acceptor, such as another bill validator, associated with a plurality of activities. For example, the EGM employs a first bill validator associated with accepting bills to fund wagers places on one or more games of chance and the EGM employs a second bill validator associated with accepting bills to funds both sports wagers placed on sporting events and wagers placed on a table game played on a remote gaming table.

In addition to employing a plurality of bill validators, in certain embodiments, the payment device includes (or is otherwise associated with) one or more of: (a) coin slot into which coins or tokens are inserted to fund the EGM (such as coin slot 206 of FIGS. 2A and 2B); (b) a reader or a validator for credit cards, debit cards, or credit slips into which a credit card, debit card, or credit slip is inserted to fund the EGM; (c) a player identification card reader into which a player identification card is inserted to fund the EGM; (d) a mobile payment device (e.g., a component of a gaming establishment management system, such as a slot machine interface board including a wireless transceiver) configured to receive data from a mobile device to facilitate the transfer of funds from a gaming establishment account to the EGM (such as described in U.S. Patent Application Publication No. 2017/0092054) and/or (e) any suitable combination thereof.

In one embodiment, the plurality of input devices 130 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the plurality of input devices 130 includes one or more wagering or betting devices. In one such embodiment, the EGM includes a separate wagering or betting device for each credit balance associated with each different activity which may be undertaken at the EGM. In another such embodiment, the EGM includes a wagering or betting device for a plurality of separate credit balances (associated with the different activities which may be undertaken at the EGM) wherein the EGM enables the player to select which credit balance will be drawn from with an actuation of the wagering or betting device. In another such embodiment, the EGM determines, based on the state of one or more of the separate credit balances, which wager to place upon an actuation of the wagering or betting device. For example, if $50 is on a credit balance associated with wagering on one or more games of chance and $0 is on a credit balance associated with placing one or more wagers on one or more table games played at a remote gaming table, the EGM determines that engaging the wagering or betting device is a desire to place a wager on a game of chance, such as a slot game. In another such embodiment, the EGM determines, based on a current mode of the EGM (which may be determined based on recent inputs made at the EGM), which game should be played upon an actuation of the wagering or betting device.

In various embodiments, the wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). Certain of such wagering or betting devices are one or more maximum wager or bet devices that, when actuated, causes the EGM to place a maximum wager on a play of a game. Other such wagering or betting devices are one or more repeat bet devices that, when actuated, causes the EGM to place a wager that is equal to the previously-placed wager on a play of a game. Other such wagering or betting devices are one or more bet one device that, when actuated, causes the EGM to increase the wager by one credit. Generally, upon actuation of one of the wagering or betting devices, the quantity of credits displayed in the applicable credit balance associated with that wagering or betting device decreases by the amount of credits wagered, while the quantity of credits displayed in a bet display (associated with the applicable wagering activity available at the EGM) increases by the amount of credits wagered.

In various embodiments, the plurality of input devices 130 includes at least one game play activation device associated with each wagering activity available at the EGM. In one such embodiment, as seen in FIG. 2A, the EGM includes a game play activation device, in the form of a game play initiation button 208, for a plurality of credit balances (associated with the different activities which may be undertaken at the EGM) wherein the EGM enables the player to select which game to play with an actuation of the game play activation device. In another such embodiment, the EGM determines, based on the state of one or more of the credit balances, which game to play upon an actuation of the game play activation device. For example, if $200 is on a credit balance associated with wagering on one or more table games played on a remote gaming table and $0 is on a credit balance associated with placing one or more wagers on one or more games of chance, the EGM determines that engaging the game play activation device is a desire to participate in the table game played on the remote gaming table. In another such embodiment, the EGM determines, based on a current mode of the EGM (which may be determined based on recent inputs made at the EGM), which game should be played upon an actuation of the game play activation device. In another such embodiment, the EGM includes a separate game play activation device for each credit balance associated with each different activity which may be undertaken at the EGM. For example, as seen in FIG. 2B, the EGM includes a first game play activation device, in the form of a first game play initiation button 208*a*, associated with a first credit balance and a second game play activation device, in form of a second game play initiation button 208*b*, associated with a second credit balance.

In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the applicable credit balance of the EGM using the appropriate payment device and places a wager on one of the available wagering opportunities accessible via the EGM, the EGM activates the applicable game play activation device to enable the player to actuate the game play activation device to initiate a play of a game on the EGM (or another suitable sequence of events associated with the EGM). After the EGM receives an actuation of the game play activation device associated with one or more of the activities available at the EGM, the EGM initiates the play of the applicable game. In other embodiments, the EGM begins game play automatically upon appropriate funding rather than upon utilization of the game play activation device.

In certain embodiments, the plurality of input devices 130 includes one or more cashout devices. In these embodiments, in addition to each bill validator being associated with a separate credit balance usable for a different activity at the EGM, each credit balance is associated with a separate cashout device to initiate a cashless payout process of that credit balance. In various embodiments, one or more of the cashout devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). In these embodiments, when the EGM receives an actuation of one of the cashout devices from a player and the player has a positive (i.e., greater-than-zero) credit balance associated with that cashout device, the EGM initiates a payout associated with that credit balance. The example EGM 200*a* illustrated in FIG. 2A includes: (i) a first cashout device in the form of a first cashout button 210*a* associated with the first credit balance funded via the receipt of one or more bills (e.g., paper currency and/or cashless ticket touchers) by the first bill validator, and (ii) a second, different cashout device in the form of a second, different cashout button 210*b* associated with the second credit balance funded via the receipt of one or more bills (e.g., paper currency and/or cashless ticket touchers) by the second bill validator.

In an alternative embodiment, one cashout device is used to individually (or collectively) cashout the different credit balances maintained by the EGM. The example EGM 200*b* illustrated in FIG. 2B includes one cashout device in the form of a cashout button 210 associated with both the first credit balance (funded via the receipt of one or more bills by the first bill validator) and the second credit balance (funded via the receipt of one or more bills by the second bill validator). In one such embodiment, either before or after engaging the cashout device, the EGM enables the player to indicate, via one or more inputs, which credit balance should be cashed out. In another such embodiment, the EGM determines, based on the state of one or more of the credit balances, which credit balance should be cashed out. For example, if $100 is on a credit balance associated with wagering on one or more games of chance and $0 is on a credit balance associated with placing one or more sports wagers on one or more sporting events, the EGM determines that engaging the cashout device is a desire to cashout the $100 on the credit balance associated with wagering one or more games of chance. In another such embodiment, the EGM determines, based on a current mode of the EGM (which may be determined based on recent inputs made at the EGM), which credit balance should be cashed out. For example, if the EGM is currently functioning as a sports wagering terminal (based on inputs made by the player pertaining to one or more available sports wagers), the EGM determines that engaging the cashout device is a desire to cashout the credit balance associated with placing one or more sports wagers on one or more sporting events.

In various embodiments, the plurality of input devices 130 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 200*a* and 200*b* illustrated in FIGS. 2A and 2B each include a plurality of such buttons 212.

In certain embodiments, the plurality of input devices 120 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

It should be appreciated that the plurality of input devices 130 may include any suitable device that enables an input signal to be produced and received by the at least one processor 110 of the EGM.

In addition to the input devices, the EGM includes at least one output device 130 including at least one display device 135 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 200*a* illustrated in FIG. 2A includes a central display device 216, an upper display device 218, and a player tracking display 214. The example EGM 200*b* illustrated in FIG. 2B includes a central display device 216, and a player tracking display 214.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 130 includes a payout device. In these embodiments, after the EGM receives an actuation of a cashout device, the EGM causes the payout device to provide a payment to the player. In one embodiment, the payout device is one or more of: (a) a bill dispenser configured to dispense paper currency; (b) a ticket printer and dispenser configured to print and dispense a ticket or credit slip associated with a monetary value, wherein the ticket or credit slip may be redeemed for its monetary value via a cashier, a kiosk, or other suitable redemption system; (c) a coin dispenser configured to dispense coins or tokens (such as into a coin payout tray); (d) a mobile payment device (e.g., a component of a gaming establishment management system, such as a slot machine interface board including a wireless transceiver) configured to receive data from a mobile device to facilitate the transfer of funds from the EGM to a gaming establishment account (such as described in U.S. Patent Application Publication No. 2017/0092054) and/or (e) any suitable combination thereof.

In one embodiment, one of the plurality of bill validators is associated with a ticket printer and dispenser. For example, as illustrated in FIGS. 2A, EGM 200*a* includes a ticket printer and dispenser 220 associated with one of the bill validators. In another embodiment, each of the plurality of bill validators is associated with a ticket printer and dispenser. In these embodiments, the ticket printer(s) and dispenser(s) are configured to print and dispense a cashless ticket voucher in associated with the activity of the cashed out credit balance. For example, a cashout input using a cashout button associated with a credit balance usable to wager on one or more games of chance results in a ticket-in ticket-out (TITO) associated with such wagering on games of chance issuing a cashless ticket voucher which is redeemable for cash at a kiosk or to establish another credit balance usable to wager on one or more games of chance at another EGM. In this example, a cashout input using a cashout button associated with a sporting event wagering credit balance cashout button results in another system, such as another TITO system or a sporting event wagering ticket system, issuing a cashless sporting event wagering ticket which is redeemable, if the placed sporting event wager was a winning sporting event wager, for cash at a kiosk or to establish another sporting event wagering credit balance at another EGM.

Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "EGM with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 130 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In embodiments including a player tracking system, as further described below, the plurality of input devices 120 includes a card reader in communication with the at least one processor of the EGM. The example EGMs 200*a* and 200*b* illustrated in FIGS. 2A and 2B each include a card reader 222. The card reader is configured to read a player identification card inserted into the card reader.

The at least one wireless communication component 156 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA200, and WCDMA; Radio Frequency (e.g., RFID); infrared; and Near Field Magnetic communication protocols. The at least one wireless communication component 156 transmits electrical, electromagnetic, or optical signals that carry digital data streams or analog signals representing various types of information.

The at least one wired/wireless power distribution component 158 includes components or devices that are configured to provide power to other devices. For example, in one embodiment, the at least one power distribution component 158 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 158 is configured to distribute power to one or more internal components of the EGM, such as one or more rechargeable power sources (e.g., rechargeable batteries) located at the EGM.

In certain embodiments, the at least one sensor 160 includes at least one of: optical sensors, pressure sensors, RF sensors, infrared sensors, image sensors, thermal sensors, and biometric sensors. The at least one sensor 160 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 162 is configured to detect or sense one or more events and/or conditions that, for example, may result in damage to the EGM and/or that may result in loss of information associated with the EGM. Additionally, the data preservation system 162 may be operable to initiate one or more appropriate action(s) in response to the detection of such events/conditions.

The at least one motion/gesture analysis and interpretation component 164 is configured to analyze and/or interpret information relating to detected player movements and/or gestures to determine appropriate player input information relating to the detected player movements and/or gestures. For example, in one embodiment, the at least one motion/gesture analysis and interpretation component 164 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 168 enables the EGM to operate in a mobile environment. For example, in one embodiment, the EGM includes one or more rechargeable batteries.

The at least one geolocation module 176 is configured to acquire geolocation information from one or more remote sources and use the acquired geolocation information to determine information relating to a relative and/or absolute position of the EGM. For example, in one implementation, the at least one geolocation module 176 is configured to receive GPS signal information for use in determining the position or location of the EGM. In another implementation, the at least one geolocation module 176 is configured to receive multiple wireless signals from multiple remote devices (e.g., EGMs, servers, wireless access points, etc.)

and use the signal information to compute position/location information relating to the position or location of the EGM.

The at least one user identification module 177 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 179 is configured to perform filtering (e.g., based on specified criteria) of selected information to be displayed at one or more displays 135 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

In addition to such peripheral devices, such as the multiple bill validators, the EGM includes a master gaming controller 112 including at least one processor 110. The at least one processor 110 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 106 of the master gaming controller 112; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 122 (such as input/output devices); and/or (5) controlling the peripheral devices 122. In certain embodiments, one or more components of the master gaming controller 112 (such as the at least one processor 110) reside within a housing of the EGM (described below), while in other embodiments at least one component of the master gaming controller 112 resides outside of the housing of the EGM.

The master gaming controller 112 also includes at least one memory device 116, which includes: (1) volatile memory (e.g., RAM 109, which can include non-volatile RAM, magnetic RAM, ferroelectric RAM, and any other suitable forms); (2) non-volatile memory 119 (e.g., disk memory, FLASH memory, EPROMs, EEPROMs, memristor-based non-volatile solid-state memory, etc.); (3) unalterable memory (e.g., EPROMs 108); (4) read-only memory; and/or (5) a secondary memory storage device 115, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 116 resides within the housing of the EGM (described below), while in other embodiments at least one component of the at least one memory device 116 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 116 is configured to store, for example: (1) configuration software 114, such as all the parameters and settings for a game playable on the EGM; (2) associations 118 between configuration indicia read from an EGM with one or more parameters and settings; (3) communication protocols configured to enable the at least one processor 110 to communicate with the peripheral devices 122; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 112 communicates with other devices using a serial communication protocol. A few non-limiting examples of serial communication protocols that other devices, such as peripherals (e.g., bill validators), may use to communicate with the master game controller 112 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system."

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 116 is configured to store program code and instructions executable by the at least one processor of the EGM to control the EGM. The at least one memory device 116 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 116 also stores a plurality of device drivers 142. Examples of different types of device drivers include device drivers for EGM components and device drivers for the peripheral components 122. Typically, the device drivers 142 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 116 can be upgraded as needed. For instance, when the at least one memory device 116 is a hard drive, new games, new game options, new parameters, new settings for existing parameters, new settings for new parameters, new device drivers, and new communication protocols can be uploaded to the at least one memory device 116 from the master game controller 112 or from some other external device. As another example, when the at least one memory device 116 includes a CD/DVD drive including a CD/DVD configured to store game options, parameters, and settings, the software stored in the at least one memory device 116 can be upgraded by replacing a first CD/DVD with a second CD/DVD. In yet another example, when the at least one memory device 116 uses flash memory 119 or EPROM 108 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 116 also stores authentication and/or validation components 144 configured to authenticate/validate specified EGM components and/or information, such as hardware components, software components, firmware components, peripheral device components, user input device components, information received from one or more user input devices, information stored in the at least one memory device 116, etc. Examples of various authentication and/or validation components are described in U.S. Pat. No. 6,620,047, entitled "Electronic Gaming Apparatus Having Authentication Data Sets".

As generally described above, in certain embodiments, such as the example EGMs 200*a* and 200*b* illustrated in FIGS. 2A and 2B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 200*a* and 200*b* shown in FIGS. 2A and 2B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely examples of different types of EGMs. Certain of these example EGMs may include one or more elements that may not be included in all EGMs, and these example EGMs may not include one or more elements that are included in other EGMs.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner.

As generally explained above, in various embodiments in which the EGM includes a changeable EGM, at least one memory device of a central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the EGM generates game outcomes and/or awards randomly or based on one or more probability calculations, there is no certainty that the EGM will ever provide any specific game outcome and/or award.

In certain embodiments, the EGM maintains one or more predetermined pools or sets of predetermined game outcomes and/or awards. In certain such embodiments, upon generation or receipt of a game outcome and/or award request, the EGM independently selects one of the predetermined game outcomes and/or awards from the one or more pools or sets. The EGM flags or marks the selected game outcome and/or award as used. Once a game outcome or an award is flagged as used, it is prevented from further selection from its respective pool or set; that is, the EGM does not select that game outcome or award upon another game outcome and/or award request. The EGM provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat.

No. 8,070,579, entitled "Bingo System with Downloadable Common Patterns"; and U.S. Pat. No. 8,398,472, entitled "Central Determination Poker Game".

In certain embodiments, the EGM determines a predetermined game outcome and/or award based on the results of a bingo, keno, or lottery game. In certain such embodiments, the EGM utilizes one or more bingo, keno, or lottery games to determine the predetermined game outcome and/or award provided for a primary game and/or a secondary game. The EGM is provided or associated with a bingo card. Each bingo card consists of a matrix or array of elements, wherein each element is designated with separate indicia. After a bingo card is provided, the EGM randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo EGM and Method for Providing Multiple Outcomes from Single Bingo Pattern".

In certain embodiments in which the EGM includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the EGM includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the EGM includes one or more executable game programs executable by at least one processor of the EGM to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the EGM includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the EGM. In certain such embodiments, the EGM includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The EGM enables a wager to be placed on one or more of such paylines to activate such paylines. In other embodiments in which one or more paylines are formed between at least two adjacent symbol display areas, the EGM enables a wager to be placed on a plurality of symbol display areas, which activates those symbol display areas.

In various embodiments, the EGM provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the EGM employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the EGM includes a progressive award. Typically, a progressive award includes an initial amount and an additional amount funded through a portion of each wager placed to initiate a play of a primary game. When one or more triggering events occurs, the EGM provides at least a portion of the progressive award. After the EGM provides the progressive award, an amount of the progressive award is reset to the initial amount and a portion of each subsequent wager is allocated to the next progressive award. Examples of progressive EGMs are described in U.S. Pat. No. 7,585,223, entitled "Server Based Gaming System Having Multiple Progressive Awards"; U.S. Pat. No. 7,651, 392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the EGM provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the EGM randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the EGM determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the EGM includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group EGMs are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win".

In various embodiments, the EGM includes one or more player tracking systems. Such player tracking systems enable operators of the EGM (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the EGM to begin a gaming session, the card reader reads the player identification number off the player tracking card to identify the player. The EGM timely tracks any suitable information or data relating to the identified player's gaming session. The EGM also timely tracks when the player tracking card is removed to conclude play for that gaming session. In another embodiment, rather than requiring insertion of a player tracking card into the card reader, the EGM utilizes one or more portable devices, such as a mobile phone, a radio frequency identification tag, or any other suitable wireless device, to track when a gaming session begins and ends. In another embodiment, the EGM utilizes any suitable biometric technology or ticket technology to track when a gaming session begins and ends.

In such embodiments, during one or more gaming sessions, the EGM tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services".

Social Network Integration

In certain embodiments, the EGM is configured to communicate with a social network server that hosts or partially hosts a social networking website via a data network (such as the Internet) to integrate a player's gaming experience with the player's social networking account. This enables the EGM to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the EGM to receive certain information from the social network server, such as the player's likes or dislikes or the player's list of connections. In certain embodiments, the EGM enables the player to link the player's player account to the player's social networking account(s). This enables the EGM to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the EGM enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the EGM sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the EGM sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the EGM sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the EGM enables the player to recommend a game to the player's connections by posting a recommendation to the player's wall (or other suitable area) of the social networking website.

Differentiating EGMs from General Purpose Computing Devices

Certain of the EGMs described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied.

For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes".

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as “fault-tolerant” memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player’s assertion. Examples of a state-based EGM, recovery from malfunctions, and game history are described in U.S. Pat. No. 6,804,763, entitled “High Performance Battery Backed RAM Interface”; U.S. Pat. No. 6,863,608, entitled “Frame Capture of Actual Game Play”; U.S. Pat. No. 7,111,141, entitled “Dynamic NV-RAM”; and U.S. Pat. No. 7,384,339, entitled, “Frame Capture of Actual Game Play”.

Another feature of EGMs is that they often include unique interfaces, including serial interfaces, to connect to specific subsystems internal and external to the EGM. The serial devices may have electrical interface requirements that differ from the “standard” EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT’s Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. An electronic gaming machine comprising:

a first payment acceptor;

a second payment acceptor;

a processor; and a memory device that stores a plurality of instructions that, when executed by the processor, cause the processor to:

responsive to a physical item being received via the first payment acceptor and an occurrence of a first reporting event, cause data associated with the receipt of the physical item via the first payment acceptor to be communicated to a server of a first accounting system associated with a first activity, and responsive to the physical item being received via the second payment acceptor and an occurrence of a second reporting event, independent of causing any data to be communicated to the server of the first accounting system, cause data associated with the receipt of the physical item via the second payment acceptor to be communicated to a server of a second, different accounting system associated with a second, different activity.

2. The electronic gaming machine of claim 1, wherein the first payment acceptor comprises a first bill validator and the second payment acceptor comprises a second bill validator.

3. The electronic gaming machine of claim 1, wherein the first payment acceptor comprises a first mobile payment device and the second payment acceptor comprises a second mobile payment device.

4. The electronic gaming machine of claim 1, wherein the first activity comprises any of wagering on a game of chance, wagering on a sporting event, and wagering on a live table game played on a remote gaming table.

5. The electronic gaming machine of claim 1, further comprising:

a first cashbox associated with the first payment acceptor, and a second, separate cashbox associated with the second payment acceptor.

6. The electronic gaming machine of claim 1, further comprising:

a first cashout device of a first balance associated with at least a monetary value of the physical item received via the first payment acceptor, and a second, different cashout device of a second, different balance associated with at least the monetary value of the physical item received via the second payment acceptor.

7. The electronic gaming machine of claim 1, wherein the memory device stores a plurality of further instructions that, when executed by the processor, cause the processor to:

cause a first display device associated with the first payment acceptor to display an indication of the first activity, and cause a second display device associated with the second payment acceptor to display an indication of the second activity.

8. A system comprising:

a processor; and a memory device that stores a plurality of instructions that, when executed by the processor, cause the processor to:

responsive to a physical item associated with a monetary value being received via a payment acceptor and a determination to assign the monetary value to a first activity undertakable at an electronic gaming machine, cause data associated with the receipt of the physical item to be communicated to a server of a first accounting system associated with the first activity, and responsive to the physical item associated with the monetary value being received via the payment acceptor and a determination to assign the monetary value to a second, different activity undertakable at the electronic gaming machine, cause data associated with the receipt of the physical item to be communicated to a server of a second, different accounting system associated with the second activity.

9. The system of claim 8, wherein the first activity comprises any of wagering on a game of chance, wagering on a sporting event, wagering on a live table game played on a remote gaming table, and a non-wagering activity.

10. The system of claim 9, wherein the second activity comprises any other of wagering on the game of chance, wagering on the sporting event, wagering on the live table game played on the remote gaming table, and the non-wagering activity.

11. The system of claim 8, wherein the determination to assign the monetary value to the first activity is based on a state of a first balance associated with the first activity.

12. The system of claim 8, wherein the determination to assign the monetary value to the first activity is based on a mode of the electronic gaming machine.

13. The system of claim 8, wherein the determination to assign the monetary value to the first activity is based on an input received via an input device of the electronic gaming machine.

14. The system of claim 8, wherein the payment acceptor comprises any of a bill validator of the electronic gaming machine and a mobile payment device.

15. A method of operating a system, the method comprising:

responsive to a physical item associated with a monetary value being received via a payment acceptor and a determination to assign the monetary value to a first activity undertakable at an electronic gaming machine, causing data associated with the receipt of the physical item to be communicated to a server of a first accounting system associated with the first activity, and responsive to the physical item associated with the monetary value being received via the payment acceptor and a determination to assign the monetary value to a second, different activity undertakable at the electronic gaming machine, causing data associated with the receipt of the physical item to be communicated to a server of a second, different accounting system associated with the second activity.

16. The method of claim 15, wherein the first activity comprises any of wagering on a game of chance, wagering on a sporting event, wagering on a live table game played on a remote gaming table, and a non-wagering activity and the second activity comprises any other of wagering on the game of chance, wagering on the sporting event, wagering on the live table game played on the remote gaming table, and the non-wagering activity.

17. The method of claim 15, wherein the determination to assign the monetary value to the first activity is based on a state of a first balance associated with the first activity.

18. The method of claim 15, wherein the determination to assign the monetary value to the first activity is based on a mode of the electronic gaming machine.

19. The method of claim 15, wherein the determination to assign the monetary value to the first activity is based on an input received via an input device of the electronic gaming machine.

20. The method of claim 15, wherein the payment acceptor comprises any of a bill validator of the electronic gaming machine and a mobile payment device.

* * * * *